Sept. 16, 1969  M. D. BRINKLEY ET AL  3,467,063
APPLYING ADHESIVE TO SKIVED TIRE TREAD
Filed June 27, 1966  2 Sheets-Sheet 1

INVENTOR.
MAX D. BRINKLEY
ROBERT I. GRIFFITHS
BY
*J. B. Holden*
ATTORNEY

Sept. 16, 1969   M. D. BRINKLEY ET AL   3,467,063
APPLYING ADHESIVE TO SKIVED TIRE TREAD
Filed June 27, 1966                    2 Sheets-Sheet 2

INVENTOR.
MAX D. BRINKLEY
ROBERT I. GRIFFITHS
BY
J.B. Holden
ATTORNEY

United States Patent Office 3,467,063
Patented Sept. 16, 1969

3,467,063
APPLYING ADHESIVE TO SKIVED TIRE TREAD
Max D. Brinkley, North Canton, and Robert I. Griffiths, Akron, Ohio, assignors to The Goodyear Tire & Rubber Company, Akron, Ohio, a corporation of Ohio
Filed June 27, 1966, Ser. No. 560,457
Int. Cl. B05c 7/06; B05b 9/00
U.S. Cl. 118—314                    11 Claims

ABSTRACT OF THE DISCLOSURE

A system for mechanically handling skived tire treads, for applying cement or adhesive to the skived ends and for safely inverting tire treads without adverse effect on the adhesive coated ends, which system includes travelling cement spray devices for applying adhesive to the ends of each tread, a pair of tread conveying means one above the other for carrying a tread to and from tread inverting means, the inverting means including a rotatable cylinder having an annular peripheral recess and an overlying belt each of which provides a tread engageable surface, the two surfaces being spaced apart so as to receive a tire tread freely therebetween.

---

This invention relates to a continuous system for skiving a tire tread and applying an adhesive to the skived ends of the tread.

In the manufacture of pneumatic tires, it is common practice to supply the uncured tire tread portion to the tire builder in a one piece tubed, or extruded, form. As is well known, such treads are, during the manufacture of the tire, wrapped circumferentially around and over the tire carcass, and the ends of the tread are spliced. The splicing is often accomplished utilizing a bevel-overlap joint, which is achieved by skiving, or beveling, the ends of the tread prior to wrapping the same about the tire carcass. Prior to joining the skived ends of the tread, it is also common practice to apply adhesive to the skived tread ends in order to facilitate the making of the splice and assure that the ends of the tread will remain joined until the tire is placed within a curing mold.

Tire treads are relatively heavy and difficult to handle manually. Accordingly, it is the primary object of this invention to provide a novel and improved system whereby tread splice adhesive is applied to one end of the skived tread, the tread inverted and adhesive applied to the other end of the skived tread, all in a continuous process which requires no manual handling of the tread.

Other objects will be in part obvious, and in part pointed out more in detail hereinafter.

The invention accordingly consists in the features of construction, combination of elements and arrangement of parts which will be exemplified in the construction hereinafter set forth, and the scope of the application of which will be indicated in the appended claims.

Figure 1:
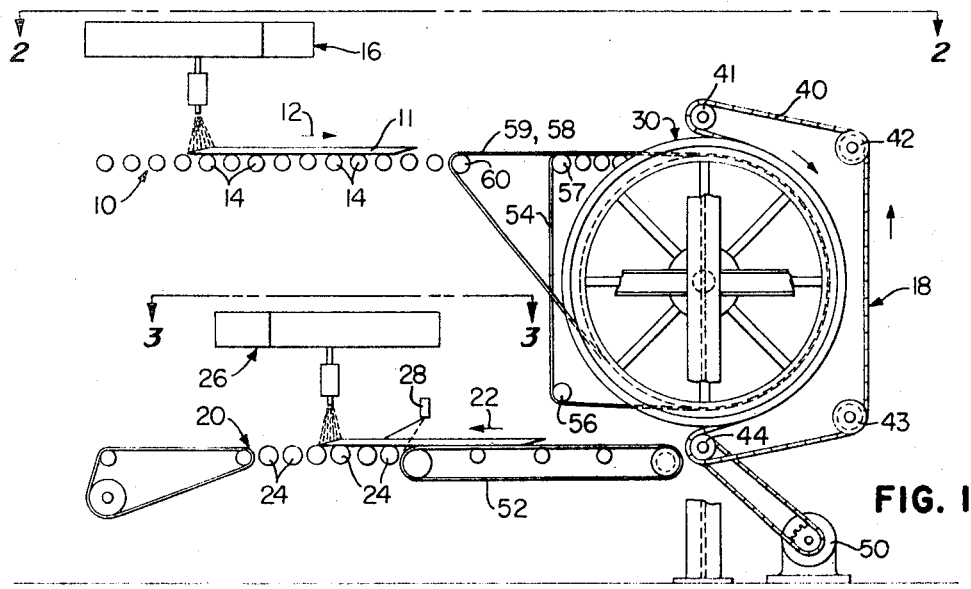
FIG. 1 is a side elevational view of a system constructed in accordance with the present invention.
Figure 2:
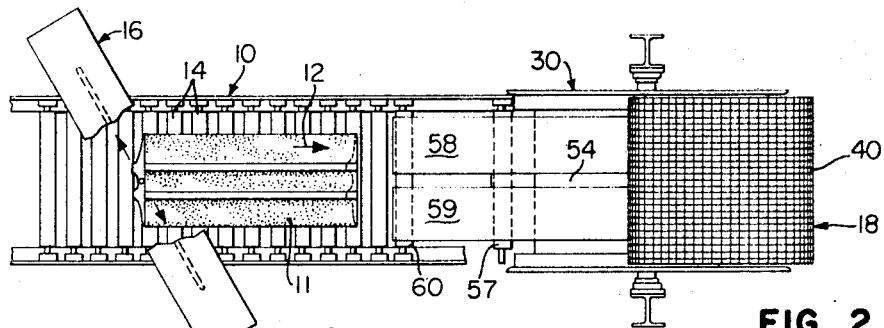
FIG. 2 is a plan view of the system of FIG. 1.
Figure 3:
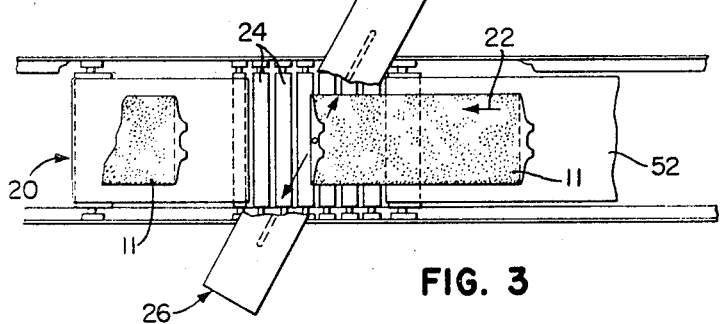
FIG. 3 is a fragmentary plan view of a portion of the system of FIG. 1 as indicated at 3—3 of FIG. 1.

With reference to the drawings and particularly FIG. 1, a system incorporating the present invention comprises conveying means, generally indicated at 10, which are adapted to support and move a skived tire tread 11 in the direction of the arrow 12. It will be understood that the system shown in FIG. 1 may be an integral part of an overall continuous system for conveying a tire tread through a skiving station (not shown) and a weighing station (not shown) and thence into the position of tread 11, shown in FIG. 1. The tread 11 is supported on the conveying means 10 with its trailing skived end facing generally upwardly and with its forward skived end facing generally downwardly. The conveying means 10 includes a plurality of parallel spaced apart powdered rollers 14, which transport the tread beneath and past an adhesive applicator generally indicated at 16. The applicator 16 is adapted to provide the trailing skived end of the tread with a coating of adhesive as the tread passes beneath the same. As shown clearly in FIG. 2, the tread ends are skived at right angles to the longitudinal centerline of the tread. The applicator 16 extends at an angle to the direction of movement 12 of the tread and includes one or more nozzles, or the like, suitably mounted for movement at an acute angle to the path of movement of the tread from one side to the other in timed relation to the movement of the tread so that the trailing end of the tread may be sprayed entirely thereacross as the tread is moved longitudinally of itself. It will be apparent that other suitable adhesive applicator means may be employed to deposit the desired adhesive or cement on the end of the tread.

The conveyor means 10 is operative to move the tread 11 toward redirecting means, generally indicated at 18, and disposed adjacent the terminal end of the conveying means 10. The redirecting means 18 is operative to transport the tread from the conveyor means 10 to a conveyor means, generally indicated at 20, which is located in parallel underlying relationship to the conveyor means 10 and is operative to support and move the tread in the direction of the arrow 22. The tread is thus moved in one direction longitudinally of itself and is then redirected in a vertical plane so as to be inverted and then moved along a second path of movement extending in parallel underlying relationship in the opposite direction to its first path of movement.

Forming a part of the lower conveying means 20, is a second set of power rollers 24 similar in structure and function to the rollers 14 previously described. Disposed over the rollers 24 is a second adhesive applicator 26 similar in structure and operation to the mechanism 16, previously described. It will be apparent that as the tread 11 is redirected in a vertical plane by the mechanism 18, the previously downwardly facing leading skived end of the tread will now be facing generally upwardly so as to be in position to receive the adhesive provided by the applicator 26. As shown in FIG. 1, a suitable actuator 28 for the adhesive applicator 26 is located along the path of movement 22 of the lower conveying means 20 so as to be engaged by the tread as it moves along the conveyor means and before it reaches the adhesive discharge means 26. The actuator 22 may be suitably mechanically, or electrically, connected to the discharge mechanism to effect traverse, or operation, of the same in timed relation to the movement of the leading edge of the tread as it passes beneath the adhesive applicator 26. The actuator 28 may be a simple pivoted arm operatively associated with an electrical switch which is connected in the control circuitry for driving the applicator 26, or may be any other suitable means known to those skilled in the art. A similar actuator, not shown, is operatively associated with the adhesive applicator 16.

Figure 4:
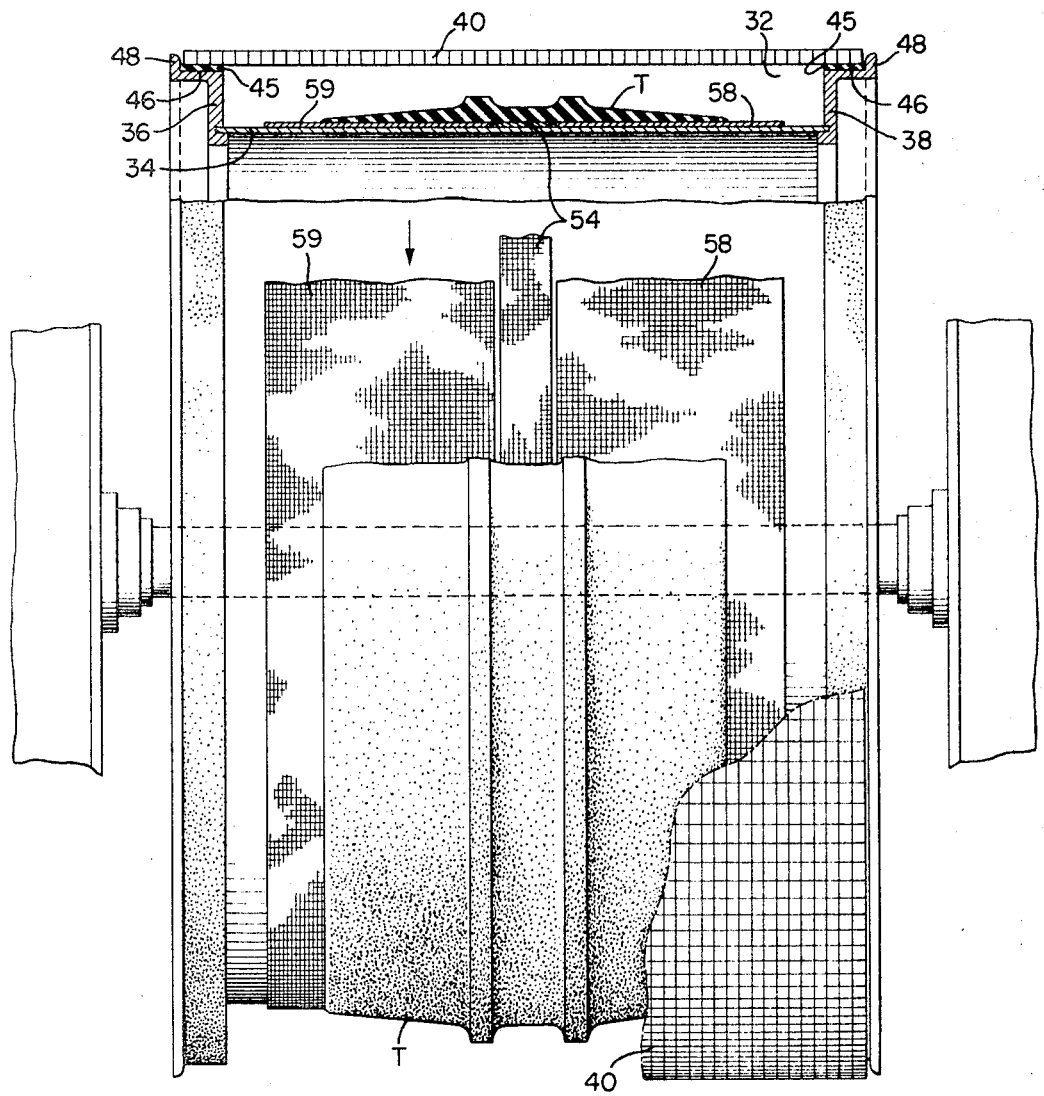
FIG. 4 is an enlarged end view, partly cut away and partly in section, of the system of FIG. 1.

The tread redirecting means 18 of the specific embodiment shown comprises a rotatable member in the form of a relatively large diameter cylinder or wheel 30, the details of which are best shown in FIG. 4. The wheel or drum 30 is mounted for rotation about a horizontal axis disposed vertically between the conveying means 10 and 20 and extending laterally of the directions of movement 12 and 22 of the tread. The drum 30 is provided with a radially outwardly opening, circumferentially extending, peripheral recess 32 having a base 34 disposed coaxially of the drum axis and sidewalls 36–38 extending radially of the drum axis. The recess 32 has a width, which, as shown in FIG. 4, is substantially greater than the width of the tread T to be handled by the system. Also, and as shown in FIG. 4, the height of the sidewalls 36, 38 of the recess 32 is substantially greater than the maximum thickness of the tread to be handled by the system.

With reference to FIGS. 1 and 4, and endless belt 40 is supported generally on the side of the drum 30 opposite the conveying means 10 and 20 and is trained over rolls or the like, 41–44. The belt shown is of open mesh metal construction although it may be of any other construction suitable for the purpose intended. The rolls 41 and 44 are located, respectively, above and below the drum with the axes of the drum and rolls being parallel and generally in vertical alignment. The belt has a width substantially greater than the width of the recess 32 in the drum so that the edges of the belt extend substantially beyond the edges of the recess 32. A pair of annular equal diameter rubber drive members, or rings, 45 are, respectively, engaged coaxially over a pair of equal diameter annular, radially outwardly facing surfaces provided coaxially of and on the drum at the radially outer terminal ends of the sides of the recess 32. The surfaces 46 respectively terminate at their axially outer ends at a pair of radially outwardly directed flanges 48. As best shown in FIG. 4, the belt 40 rests on the drive members 45 and is in overlying frictional driving engagement therewith with the belt being retained on the drum, with respect to movement axially of the drum, by the flanges 48. The rubber drive members 45 are mounted for movement with the drum whereby driving of either the drum or belt will result in corresponding movement of the other. In the specific embodiment shown in FIG. 1, the roll 44 is driven by an electric motor 50. The roll 44 is drivingly connected by a chain sprocket drive, or the like, to a belt 52 forming a part of the conveying means 20. If desired, the belt 40 could be extended and trained so as to serve the function of the belt 52.

With the arrangement of the belt 40, as shown in FIGS. 1 and 4, the belt will engage the drum over approximately one-half the circumference of the drum and will in cooperation with the drum provide a means of supporting, conveying and inverting the tread as the tread is moved from the conveying means 10 to the conveying means 20. More particularly, as the tread is moved from the conveying means 10 onto the drum, it will be moved angularly in a clockwise direction, as viewed in FIG. 1, about the axis of the drum, remaining in contact with the drum until the leading edge of the tread passes through a horizontal plane extending through the drum axis, whereupon there will be a tendency for the tread to drop onto the belt for support thereby during the remainder of the inversion of the tread as it traverses about the drum axis.

In view of the tendency of uncured tread rubber to adhere to surfaces with which it is in contact, means are provided to assure that the tread will become separated from the drum and be supported on the conveying means 20 for further movement. More particularly and with reference to FIGS. 1 and 4, a narrow stripper belt 54 is trained about the drum 30 on the side thereof underlying the belt 40 and is also trained about a pair of rolls, or the like, 56 and 57 disposed on the opposite side of the drum. The belt 54 has a width which is a small fraction of the width of the drum and also of the width of the tread to be handled by the system. The belt 54 is centered on the drum and extends tangentially therefrom at points located substantially in a vertical plane passing through the axis of the drum and thence generally horizontally. Disposed on opposite sides respectively of the belt 54 are a pair of relatively wide belts 58, 59 having a thickness corresponding to the thickness of the center belt 54. The belts 58, 59 are trained over the drum on the same side of the drum as the belt 54 and extend tangentially from the top of the drum to rolls, or the like, 60 spaced a substantial distance from the drum in a direction opposite the direction of movement 12 toward the drum. The belts 58, 59 form a part of the conveying means 10 and serve to move the tread from the end of the set of powered rollers 14 onto the drum. The belts 58, 59 extend tangentially of the lower side of the drum and upwardly to the roll 60 from a point spaced vertically above the lower tangent point between the center belt 54 and drum. Accordingly, as the tread moves about the drum it is initially supported by the belts 54, 58 and 59. As noted above, the tread may have a tendency to stick to the outer surface of these belts even after passing onto the underside of the drum. However, it will be noted from FIG. 1 that as soon as any one portion of the center narrow belt 54 passes through vertical alignment with the drum axis it moves in a horizontal plane while the side belts move vertically upwardly, so that the center belt will separate the tread from the side belts. The very narrow width of the center belt with respect to the width of the tread assures that the weight of the tread will cause the tread to separate from the belt 54 and fall onto the lower conveying means 20.

Figure 5:
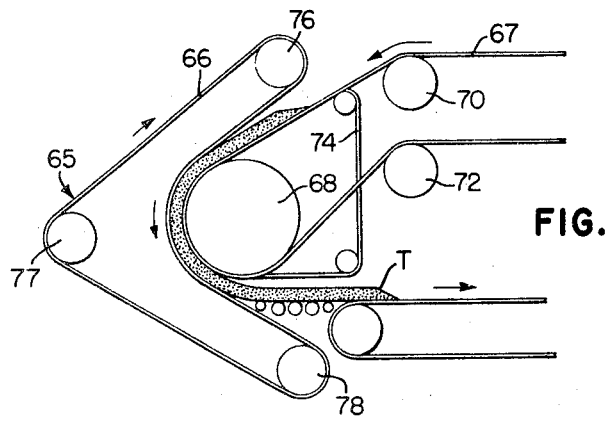
FIG. 5 is a schematic elevational view of an alternate embodiment of a portion of the system according to the invention.

With reference to FIG. 5, there is shown an alternative embodiment of the redirecting mechanism for a system as described above. This redirecting mechanism is generally indicated at 65, and comprises a pair of belts 66 and 67. The belt 67 may actually comprise a pair of belts similar to the belts 58, 59 previously described and are trained over a relatively large diameter roll, or pulley, 68, as well as additional supporting rolls 70 and 72. A third narrow central belt 74, serving the same function as the belt 54 previously described, may also be provided. The belt 66 is trained over three rolls or the like 76–78 with the rolls 76 and 78 being respectively located above and below the roll 68. The rolls 76 and 78 are disposed relative to the roll 68 such that the portion of the belt 66 extending between the rolls 76 and 78 will, in the absence of a tread T, engage and extend for a substantial distance around the axis of the roll 68 in contact with the portion of the belt 67 trained over the roll 68. Accordingly, when a tread T is moved between the belts 66 and 67 the tread will be simultaneously gripped therebetween with the tread in direct contact with both belts and the tread will thence be redirected about the axis of the drum 68 for subsequent movement in a reverse direction. As in the case of the previously described embodiment, either the belt 66 or 67 may be driven in order to accomplish the desired redirection and movement of the tread about the axis of the drum 68.

In the aforedescribed embodiments the tread has been described as being moved from an upper horizontal path about a horizontal axis to a lower horizontal path. However, it will be apparent that if desired the direction of movement of the tread could be reversed. Further, in both of the above described embodiments the tread is oriented on the first conveying means such that the trailing edge of the tread is facing upwardly and adhesive is applied to this end first. This is not to say that it is outside the scope of the invention to reverse the orientation of the tread, or to apply adhesive to the leading edge of the tread first. However, it is preferred that the initial orientation of the tread, the selection of the end of the tread to which the adhesive is initially applied, and the configuration of the belts, or drum and the like, for redirecting the tread, including the dimensions of these elements relative to the tread dimensions, be such that there is no wiping of the adhesive from the tread as the tread is redirected and, secondly, that the redirection of the tread does not result in any significant elongation of the same which would result in the tread being of improper length when it finally reaches the tire builder. In this connection and with respect of the embodiment of FIG. 1, the depth of the recess in the drum, or roll 30, should be greater than the thickness of the tread; for example, in a practical embodiment of the invention the recess 32 in the drum is approximately 3 inches in depth with the tread having a maximum thickness of 1¾ inches. Further, the radius of the arc of redirection of the tread should be sufficiently large that there is no appreciable elongation of the outer portion of the tread as it is redirected. Again a practical embodiment of the invention similar to FIG. 1 effective diameter of the drum 30 is approximately 4½ feet, although it is believed diameter as low as 3 to 3½ feet may be used to accomplish the purpose intended. Further, it is believed that the embodiment of FIG. 1 more reliably assures that the adhesive which has been applied to the trailing edge of the tread will not be contacted by the belt 40 as the tread is redirected than is the case of the embodiment of FIG. 5 wherein the tread is during redirection contacted on opposite sides by a pair of belts.

What is claimed is:

1. A system for applying adhesive to the ends of skived tire tread comprising means for moving a skived tread longitudinally of itself and along a pair of vertically displaced parallel and oppositely directly paths, and means for redirecting the tread from one of said paths to the other while at the same time inverting the tread including a rotatable member having an axis disposed vertically between said paths and extending laterally of said paths, said member having a radially outwardly opening recess extending about its periphery and defined by circumferential outwardly extending sidewalls for receiving a tread, an endless belt having a portion thereof extending about said member in overlying relation to said recess from a point substantially above to a point substantially below said axis for cooperation with said member in the support of a tread and the redirection thereof from said one to the other of said paths, and means for effecting rotation of said member and driving of said belt.

2. A system as described in claim 1, in which the last mentioned means includes providing a driving connection between said belt and member, and means for driving one of said belt and said member.

3. A system as described in claim 2 in which said belt has a width greater than that of said recess and the edges of said portion of the belt are in frictional driving relationship with means on said member disposed outwardly of the sides of said recess.

4. A system as described in claim 3 in which said portion of the belt extends coaxially about the axis of said member and is in contact with said means on said member for approximately one-half the circumference of said member.

5. A system as described in claim 3 in which said means on said member comprise a pair of annular rubber members mounted coaxially on said member for rotation therewith, said pair of annular members being in frictional driving contact with said belt.

6. A system as described in claim 2 in which said belt is spaced from the bottom of said recess a distance substantially greater than the thickness of a tread to be handled by said system, the edges of said belt extending beyond the sides of said recess and being in frictional driving contact with means on said member to provide said driving connection between said belt and said member, said portion of the belt overlying said recess extending approximately half way about said member.

7. A system as described in claim 6 in which said means for moving a tread along said paths includes first conveyor means extending toward said member and disposed above the axis of said member to move a tread toward said member, said conveyor means being adapted to support a tread having its opposite skived ends respectively facing generally upwardly and downwardly, means for applying adhesive to the one upwardly facing end of the tread as it is being moved by said conveying means toward said member, second conveying means for a tread extending away from said member and disposed below said axis for moving a tread away from said member, and second means for applying adhesive to the other now upwardly facing end of the tread as it is being moved by said second conveying means.

8. A system as described in claim 1 in which said portion of the belt overlying said recess is spaced from the bottom of said recess a distance substantially greater than the thickness of a tread to be handled by the system.

9. A system as described in claim 1 in which said portion of the belt extends coaxially about said axis of said member and in overlying relationship to said recess for substantially more than 90°.

10. A system as described in claim 1 further comprising a second endless stripper belt having a portion trained about said member in contact with the bottom of said recess and in underlying relation to said portion of the first mentioned belt, said second belt extending tangentially of and out of contact with the bottom of said recess and generally away from said portion of said first mentioned belt from a point located adjacent the bottom of said member, said second belt having a width which is a small fraction of the width of said recess and of a tread to be handled by said system.

11. A system as described in claim 10 further comprising a pair of endless belts respectively having portions trained about said member in contact with the bottom of said recess and lying alongside and on opposite sides respectively of said portion of said second belt, said pair of belts being trained externally of said member to provide at least a part support and conveying means for a tread to move the tread along the upper one of said paths toward said member, said pair of belts extending tangentially of and away from the bottom of said recess adjacent the bottom of said member and in a direction away from said portion of said first mentioned belt from a point on said member spaced angularly about said axis in the direction of rotation of said member from the point of departure of said second belt from said bottom of said recess adjacent the bottom of said member.

References Cited

UNITED STATES PATENTS

| 2,907,441 | 10/1959 | Nafziger | 198—165 X |
| 2,355,879 | 8/1944 | MacFarlane et al. | |
| 2,470,580 | 5/1949 | Schneider et al. | 118—324 X |
| 2,640,445 | 6/1953 | Reget. | |
| 3,111,430 | 11/1963 | Graf | 118—324 X |
| 3,195,501 | 7/1965 | Barkhau | 118—324 X |

WALTER A. SCHEEL, Primary Examiner

JOHN P. McINTOSH, Assistant Examiner

U.S. Cl. X.R.

118—319, 324; 119—103; 198—165

PO-1050
(5/69)

UNITED STATES PATENT OFFICE
CERTIFICATE OF CORRECTION

Patent No. 3,467,063          Dated Sept 16, 1969

Inventor(s) Max D Brinkley and Robert I. Griffiths

It is certified that error appears in the above-identified patent and that said Letters Patent are hereby corrected as shown below:

Column 1, line 25, this paragraph has been omitted:

"The foregoing abstract is not to be taken as limiting the invention of this application, and in order to understand the full nature and extent of the technical disclosure of this application, reference must be made to the accompanying drawings and the following detailed description."

Column 2, line 10, "powdered" should read -- powered --.

SIGNED AND
SEALED
MAR 3 - 1970

(SEAL)
Attest:

Edward M. Fletcher, Jr.
Attesting Officer

WILLIAM E. SCHUYLER, JR
Commissioner of Patents